United States Patent
Kawai et al.

(10) Patent No.: US 12,300,077 B2
(45) Date of Patent: May 13, 2025

(54) ACTION DETECTION SYSTEM, ACTION DETECTION METHOD, AND NON-TRANSITORY COMPUTER-READABLE MEDIUM

(71) Applicant: NEC Corporation, Tokyo (JP)

(72) Inventors: Ryo Kawai, Tokyo (JP); Noboru Yoshida, Tokyo (JP); Jianquan Liu, Tokyo (JP); Shunsuke Tsuda, Tokyo (JP); Yuki Tsuruoka, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 18/274,620

(22) PCT Filed: Jul. 28, 2021

(86) PCT No.: PCT/JP2021/027844
§ 371 (c)(1),
(2) Date: Jul. 27, 2023

(87) PCT Pub. No.: WO2023/007601
PCT Pub. Date: Feb. 2, 2023

(65) Prior Publication Data
US 2024/0096182 A1    Mar. 21, 2024

(51) Int. Cl.
*G07G 1/00* (2006.01)
*A47F 9/04* (2006.01)
*G06V 20/40* (2022.01)

(52) U.S. Cl.
CPC ........... *G07G 1/0036* (2013.01); *A47F 9/047* (2013.01); *G06V 20/44* (2022.01)

(58) Field of Classification Search
CPC .. G07G 1/0036; G07G 1/0045; G07G 1/0072; G07G 1/0081; G07G 1/0054;
(Continued)

(56) References Cited

U.S. PATENT DOCUMENTS

2006/0104479 A1* 5/2006 Bonch-Osmolovskiy ................... G06V 40/28
382/103
2006/0243798 A1* 11/2006 Kundu .................... G06V 20/41
235/383
(Continued)

FOREIGN PATENT DOCUMENTS

JP    2015-069419 A    4/2015
JP    2016-224734 A    12/2016
(Continued)

OTHER PUBLICATIONS

International Search Report for PCT Application No. PCT/JP2021/027844, mailed on Sep. 7, 2021.

*Primary Examiner* — Jamara A Franklin

(57) ABSTRACT

An action detection system (10) includes an action specification unit (18) configured to start specification of at least one action ID based on at least part of skeleton information extracted from video data that is a captured video of a user in response to detection of the user visiting checkout machine determined in advance, a determination unit (20) configured to determine whether or not an action sequence including the specified at least one action ID corresponds to registration action sequences registered in advance, and a processing control unit (21) configured to execute processing determined in advance in accordance with a determination result.

9 Claims, 16 Drawing Sheets

(58) Field of Classification Search
CPC ...... G07G 1/0063; G07G 3/003; A47F 9/047; G06V 20/44; G06V 20/41; G06V 40/28; G06V 20/52; G06Q 20/18; G06Q 20/20; G06Q 20/208; G06Q 30/06; G06Q 50/10; G08B 21/00
See application file for complete search history.

(56) References Cited

U.S. PATENT DOCUMENTS

| | | | |
|---|---|---|---|
| 2016/0351023 | A1 | 12/2016 | Takeno et al. |
| 2017/0061204 | A1 | 3/2017 | Kuwabara et al. |
| 2017/0316397 | A1 | 11/2017 | Miyagi et al. |
| 2021/0185221 | A1 | 6/2021 | Shimauchi et al. |
| 2022/0222472 | A1* | 7/2022 | Miyagi ................. G06V 20/52 |

FOREIGN PATENT DOCUMENTS

| | | | | |
|---|---|---|---|---|
| JP | 2017-199188 | A | | 11/2017 |
| JP | 2020-080082 | A | | 5/2020 |
| JP | 2022109011 | A | * 7/2022 | ......... G06K 9/00288 |
| WO | 2015/173869 | A1 | | 11/2015 |
| WO | 2019/124111 | A1 | | 6/2019 |

* cited by examiner

| REGISTRATION ACTION ID | CONTENT OF ACTION |
|---|---|
| A | TAKE OUT PRODUCT FROM BASKET BEFORE SCANNING |
| B | SCAN PRODUCT |
| C | PUT PRODUCT IN BASKET AFTER SCANNING |
| D | PRESS SCANNING END BUTTON |
| E | INPUT QUANTITY TO CHECKOUT MACHINE |

Fig. 9

| NORMAL ACTION SEQUENCE ID | CONTENT OF SEQUENCE | CONTENT OF NORMAL ACTION |
|---|---|---|
| 11 | A→B→C→D | SCANNING ENDS AFTER SCANNING IS PERFORMED ONCE |
| 12 | A→B→C→A→B→C→D | SCANNING ENDS AFTER SCANNING IS PERFORMED TWICE |
| 13 | A→B→C→E→D | SCANNING IS PERFORMED ONCE, QUANTITY IS INPUT, AND SCANNING ENDS |
| 14 | A→B→C→E→A→B→C→D | SCANNING IS PERFORMED ONCE, QUANTITY IS INPUT, SCANNING IS PERFORMED ONCE MORE, AND SCANNING ENDS |
| ... | | |

Fig. 10

| ILLICIT ACTION SEQUENCE ID | CONTENT OF SEQUENCE | CONTENT OF ILLICIT ACTION |
|---|---|---|
| 21 | ?→A→C→? | PUT PRODUCT IN BASKET AFTER SCANNING WITHOUT SCANNING PRODUCT |
| 22 | – | STOP BY CHECKOUT MACHINE, BUT LEAVE WITHOUT DOING ANYTHING |
| ... | | |

Fig. 11

| ILLICIT ACTION SEQUENCE ID | CONTENT OF SEQUENCE | CONTENT OF ILLICIT ACTION |
|---|---|---|
| 21 | ?→A→C→? | PUT PRODUCT IN BASKET AFTER SCANNING WITHOUT SCANNING PRODUCT |
| 22 | - | VISIT CHECKOUT MACHINE, BUT LEAVE WITHOUT DOING ANYTHING |
| 23 | ?→A→B'→C→? | PRETEND TO PERFORM SCANNING, BUT DOES NOT ACTUALLY PERFORM SCANNING |
| ... | | |

Fig. 14

ACTION DETECTION SYSTEM, ACTION DETECTION METHOD, AND NON-TRANSITORY COMPUTER-READABLE MEDIUM

This application is a National Stage Entry of PCT/JP2021/027844 filed on Jul. 28, 2021, the contents of all of which are incorporated herein by reference, in their entirety.

TECHNICAL FIELD

The present disclosure relates to an action detection system, an action detection method, and a non-transitory computer-readable medium.

BACKGROUND ART

In recent years, self-service checkout machine in a form in which customers scan barcodes of products and pay bills has been in widespread use. At stores with no staff or few staff, it is desired to automatically detect an illicit act of an operator of the self-service checkout machine. Note that there is also a similar need to automatically detect an illicit act of an operator in other apparatuses that handle money as well as the self-service checkout machine.

For example, Patent Literature 1 discloses a monitoring system that determines whether an illicit act occurs by comparing an action of an operator of a sorter of a cash center with moving images of patterns of illicit acts and transmits a fact of the detected illicitness and a proof thereof to a management terminal. A management server of the monitoring system analyzes a stored moving image file and checks whether image data corresponding to the patterns of illicit acts is included in the moving image file.

CITATION LIST

Patent Literature

Patent Literature 1

Japanese Unexamined Patent Application Publication No. 2020-080082

SUMMARY OF INVENTION

Technical Problem

Here, in a case where it is desired to detect an illicit act of an operator in real time, it is necessary to constantly analyze a video from a monitoring camera and confirm whether or not there is an illicit act. However, there has been a problem that if analysis processing is continuously executed, processing load increases, and an amount of data to be processed becomes enormous.

In view of the above-described problem, an object of the present disclosure is to provide an action detection system that suitably detects an illicit act related to checkout machine, an action detection method, and a non-transitory computer-readable medium.

Solution to Problem

An action detection system according to one aspect of the present disclosure includes
 action specification means for starting specification of at least one action ID based on at least part of skeleton information extracted from video data that is a captured video of a user in response to detection of the user visiting checkout machine determined in advance,
 determination means for determining whether or not an action sequence including the specified at least one action ID corresponds to registration action sequences registered in advance, and
 processing control means for executing processing determined in advance in accordance with a determination result.

An action detection method according to one aspect of the present disclosure includes
 starting specification of at least one action ID based on at least part of skeleton information extracted from video data that is a captured video of a user in response to detection of the user visiting checkout machine determined in advance,
 determining whether or not an action sequence including the specified at least one action ID corresponds to registration action sequences registered in advance, and
 executing processing determined in advance in accordance with a determination result.

A non-transitory computer-readable medium according to one aspect of the present disclosure stores a program for causing a computer to execute
 action specification processing of starting specification of at least one action ID based on at least part of skeleton information extracted from video data that is a captured video of a user in response to detection of the user visiting checkout machine determined in advance,
 determination processing of determining whether or not an action sequence including the specified at least one action ID corresponds to registration action sequences registered in advance, and
 processing control processing of executing processing determined in advance in accordance with a determination result.

Advantageous Effects of Invention

According to the present disclosure, it is possible to provide an action detection system that suitably detects an illicit act related to checkout machine, an action detection method, and a non-transitory computer-readable medium.

BRIEF DESCRIPTION OF DRAWINGS

FIG. 9 is a view for explaining a registration action according to the second example embodiment;

FIG. 10 is a view for explaining a normal action sequence according to the second example embodiment;

FIG. 11 is a view for explaining an illicit action sequence according to the second example embodiment;

FIG. 14 is a view for explaining an illicit action sequence according to the third example embodiment;

EXAMPLE EMBODIMENTS

Figure 1:
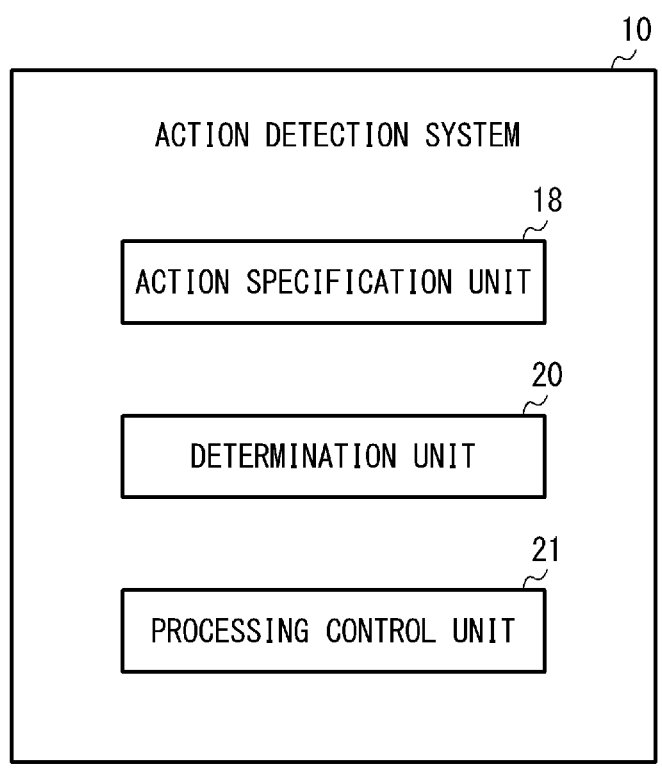
FIG. 1 is a block diagram illustrating a configuration of an action detection system according to a first example embodiment.

While the present disclosure will be described below through example embodiments, the disclosure according to the claims is not limited to the following example embodiments. Further, all components described in the example embodiments are not necessarily essential as the solution to the problem. In each drawing, the same elements are denoted by the same reference numerals, and redundant description will be omitted as necessary.

First Example Embodiment

A first example embodiment of the present disclosure will be described first. FIG. 1 is a block diagram illustrating a configuration of an action detection system 10 according to the first example embodiment. The action detection system 10 is a computer system that detects an illicit act related to checkout machine by a user who has visited the checkout machine of a store. The checkout machine is an apparatus that executes processing related to money based on operation by an operator. The action detection system 10 includes an action specification unit 18, a determination unit 20 and a processing control unit 21.

The action specification unit 18 is also referred to as action specification means. The action specification unit 18 starts specification of an action ID based on skeleton information extracted from video data that is a captured video of a user in response to detection of the user visiting checkout machine determined in advance. The action ID is information that identifies an action. One action ID may identify each of individual actions such as "taking out a product from a basket", "scanning a product" and "putting a product in a basket". Further, one action ID may identify a series of actions in which a plurality of individual actions are combined, such as "taking out a product from a basket, scanning the product and putting the product in the basket". Further, the action specification unit 18 may specify one action ID or a plurality of action IDs from the video data. Note that the action specification unit 18 may specify the action ID based on all skeleton information extracted from the video data or may specify the action ID based on part of the skeleton information.

Here, "the user visiting checkout machine" is also referred to as a start trigger. Detection of the start trigger may be detection of a person region from a video of a camera that captures a video of the scenery around the checkout machine. Particularly, detection of the start trigger may be detection of a person region recognized as the same person for a predetermined period. Further, the start trigger may be detection of a basket in which products are put being placed on a predetermined table, from a video of the camera or a measurement value of a weight sensor. Further, detection of the start trigger may be detection of an operation signal indicating that a checkout start button is depressed. Still further, detection of the start trigger may be acquisition of sound of checkout start.

Then, the action specification unit 18 may finish specification of an action ID in response to detection of the user leaving the checkout machine. "The user leaving the checkout machine" is also referred to as an end trigger. Detection of the end trigger may be that a person region is no longer detected from the video of the camera that captures a video of the scenery around the checkout machine. Particularly, detection of the end trigger may be that the person region recognized as the same person is no longer detected for a predetermined period after the start trigger. Further, detection of the end trigger may be that it is detected from the video of the camera or the measurement value of the weight sensor that the product not yet scanned disappears from the basket placed on the predetermined table. Further, detection of the end trigger may be detection of an operation signal indicating that a checkout end button is depressed. Still further, detection of the end trigger may be acquisition of sound of checkout completion.

The determination unit 20 is also referred to as determination means. The determination unit 20 determines whether or not an action sequence including the specified at least one action ID corresponds to registration action sequences. The registration action sequences determine normal acts related to the checkout machine, and constitution of the action sequences is registered in advance in an action sequence table (not illustrated). The registration action sequences include one or a plurality of registration action IDs that are action IDs registered in advance in an action database (DB) (not illustrated). Note that in a case where the registration action sequences include a plurality of registration action IDs, the registration action sequences include combinations of registration action IDs and information on time-series order of the respective registration action IDs. For example, the registration action sequences include a plurality of registration action IDs in time series.

The processing control unit 21 is also referred to as processing control means. The processing control unit 21 executes processing determined in advance in accordance with a result of the determination described above. The processing determined in advance may be broadcasting of alarm information to the user, broadcasting of alarm information to a staff of the store or recording of a fact that the above-described action sequence does not correspond to the registration action sequences.

Figure 2:
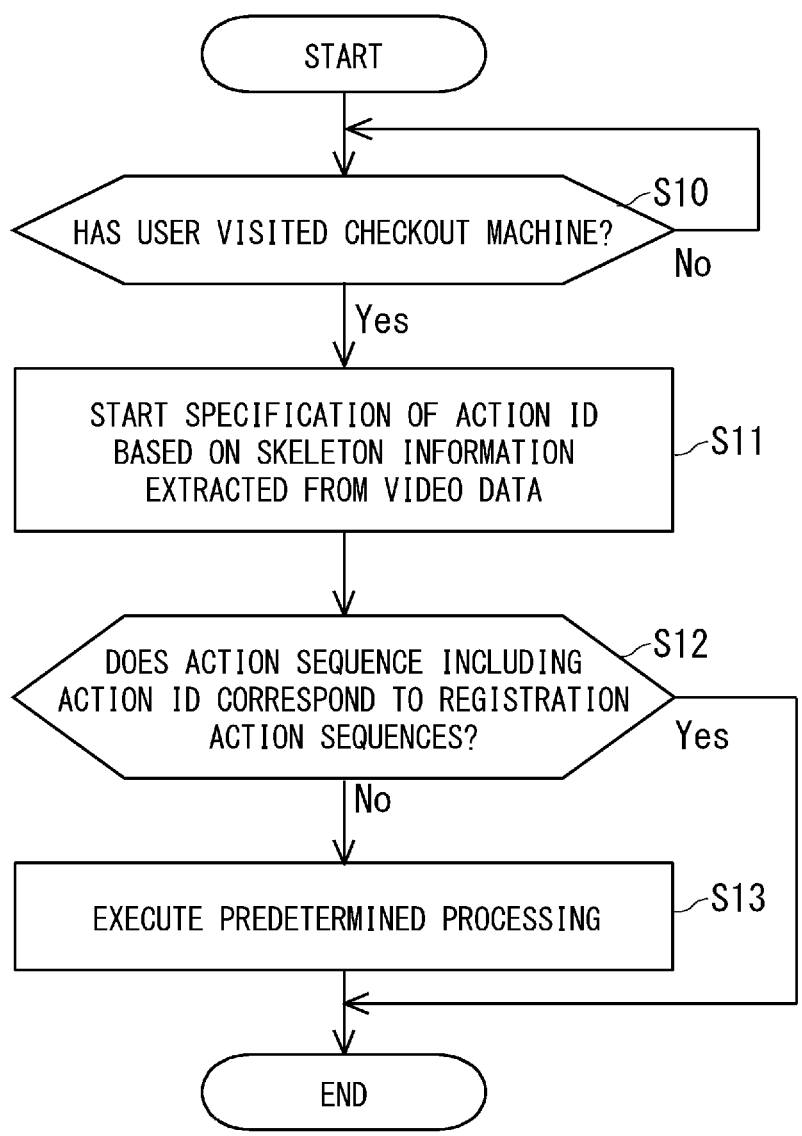
FIG. 2 is a flowchart indicating flow of an action detection method according to the first example embodiment.

FIG. 2 is a flowchart indicating flow of an action detection method according to the first example embodiment. First, the action detection system 10 determines whether or not the user has visited the checkout machine (S10). In other words, the action detection system 10 determines whether or not the start trigger has been detected. Then, in a case where it is determined that the user has visited the checkout machine (S10: Yes), the action specification unit 18 starts specification of an action ID based on skeleton information extracted from video data (S11). The determination unit 20 determines whether or not an action sequence including the action ID specified in S11 corresponds to the registration action sequences (S12). In a case where it is determined that the above-described action sequence corresponds to the registration action sequences (S12: Yes), the determination unit 20 determines that a normal act is performed, and the processing ends. On the other hand, in a case where it is not determined that the above-described action sequence corresponds to the registration action sequences (S12: No), the determination unit 20 determines that an illicit act is performed, and the processing proceeds to S13. Then, the processing control unit 21 executes predetermined processing (S13), and the processing ends.

In this manner, according to the first example embodiment, the action detection system 10 detects an illicit act related to the checkout machine by determining whether or not flow of an action of the user who has visited the checkout machine is normal. It is therefore possible to automatically detect an illicit act by the user even at a store with few staff or no staff.

Here, in the action detection system 10, specification of an action is performed after waiting for the user to visit the checkout machine, so that processing load can be reduced, and an amount of data to be processed can be reduced. Further, the action detection system 10 finishes specification of an action in a case where the user leaves the checkout machine, and thus, the above-described effect can be more significantly obtained. This enables the action detection system 10 to suitably detect an illicit act related to the checkout machine.

Note that in the action detection system 10, skeleton information is used for specification of an action, and thus, it is not necessary to hold specific pixel information. It is therefore possible to secure privacy.

Second Example Embodiment

Figure 3:
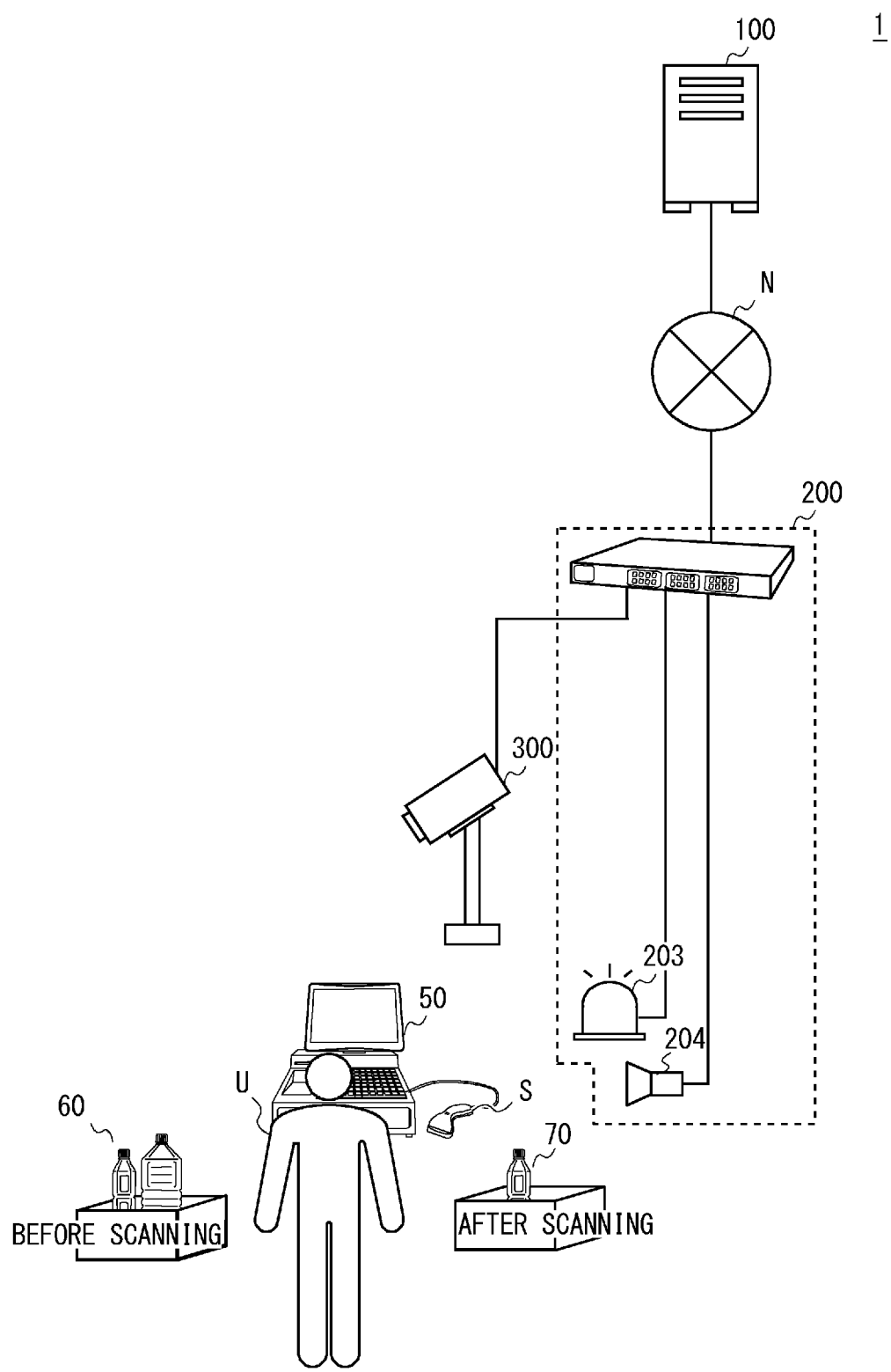
FIG. 3 is a view illustrating an overall configuration of an action detection system according to a second example embodiment.
Figure 4:
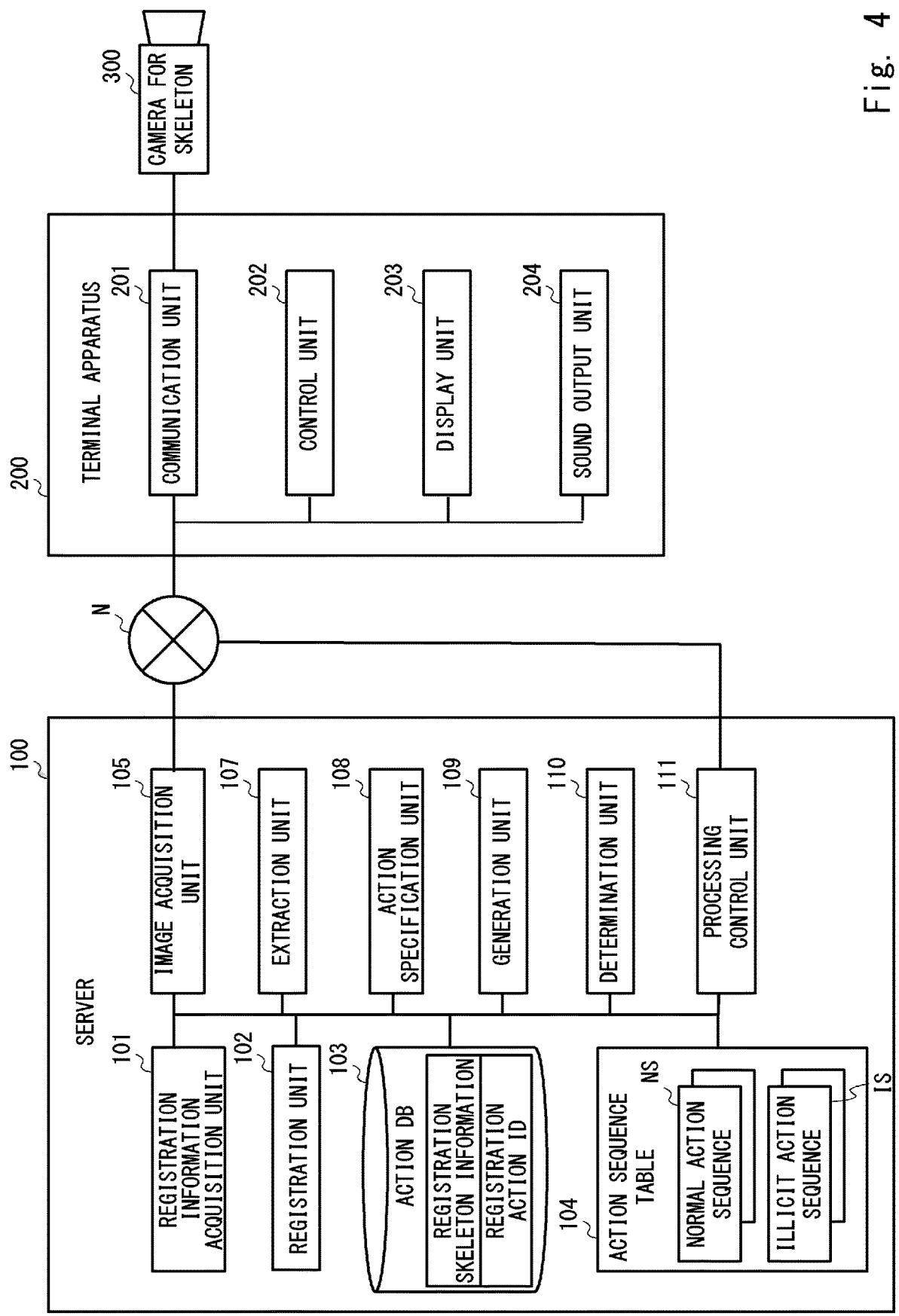
FIG. 4 is a block diagram illustrating configurations of a server and a terminal apparatus according to the second example embodiment.

A second example embodiment of the present disclosure will be described next. FIG. 3 is a view illustrating an overall configuration of the action detection system 1 according to the second example embodiment. The action detection system 1 is a computer system that monitors a user U who has visited the checkout machine 50 and executes predetermined processing in response to detection of an illicit act.

As an example, normal flow in a case where the user U checks out at the checkout machine 50 at a store is as follows.

(1) First, the user U puts a product taken out from a store shelf of the store in a basket and visits the checkout machine 50 upon checkout. (2) The user U places the basket on a table for a basket 60 before scanning. (3) The user U takes out the product from the basket 60 before scanning. (4) The user U waves a barcode of the product over a hand scanner S of the checkout machine 50 to scan the product. (5) The user U puts the scanned product in a basket 70 after scanning. (6) The user U repeats actions from (3) to (5) until there is no more product not yet scanned from the basket 60 before scanning. (7) After scanning is finished, the user U depresses a scanning end button. (8) The user U checks out for the scanned product.

Note that a place to which the scanned product is put is not limited to the basket 70 after scanning. For example, the user U may put the scanned product in a personal bag (so-called own shopping bag) or may put the scanned product in an arbitrary empty space. Further, the user U may return the scanned product to the basket 60 before scanning.

Here, the action detection system 1 includes a server 100, a terminal apparatus 200, and a camera 300 for skeleton. The server 100 is connected to the terminal apparatus 200 via a network N so as to be able to perform communication. The network N may be either a wired network or a wireless network.

The camera 300 for skeleton is a camera that captures a video of the user U who stands before the checkout machine 50 and monitors the user U. The camera 300 for skeleton is disposed at such a position and an angle that a video of at least part of the body of the user U who stands before the checkout machine 50 can be captured. In the second example embodiment, the camera 300 for skeleton is constituted so as to capture a video of an upper body of the user U.

The terminal apparatus 200 acquires video data from the camera 300 for skeleton and transmits the video data to the server 100 via the network N. Further, the terminal apparatus 200 receives alarm information indicating that the server 100 detects an illicit act of the user U and outputs the alarm information using a display unit 203 or a sound output unit 204. The display unit 203 of the terminal apparatus 200 may be provided at a position at which the user U or a staff of the store can easily view the display unit 203. Further, the sound output unit 204 of the terminal apparatus 200 may be provided at a position at which the user U or a staff of the store can easily hear sound.

The server 100 is a computer apparatus that detects an illicit act related to the checkout machine 50 by the user U based on the video data received from the terminal apparatus 200. In a case where an illicit act is detected, the server 100 transmits alarm information to the terminal apparatus 200 via the network N.

IG. 4 is a block diagram illustrating configurations of the server 100 and the terminal apparatus 200 according to the second example embodiment.

(Terminal Apparatus 200)

The terminal apparatus 200 includes a communication unit 201, a control unit 202, a display unit 203 and a sound output unit 204.

The communication unit 201 is also referred to as communication means. The communication unit 201 is a communication interface with the network N. Further, the communication unit 201 is connected to the camera 300 for skeleton and acquires video data from the camera 300 for skeleton at predetermined time intervals.

The control unit 202 is also referred to as control means. The control unit 202 controls hardware of the terminal apparatus 200. For example, in a case where the start trigger is detected, the control unit 202 starts transmission of the video data acquired from the camera 300 for skeleton to the server 100. Detection of the start trigger indicates "detection of the user visiting the checkout machine" described above. Further, for example, in a case where the end trigger is detected, the control unit 202 finishes transmission of the video data acquired from the camera 300 for skeleton to the server 100. Detection of the end trigger indicates "detection of the user U leaving the checkout machine 50" described above.

Then, in a case where the communication unit 201 receives the alarm information from the server 100, the control unit 202 causes the alarm information to be displayed at the display unit 203. Further, the control unit 202 may cause the alarm information to be output from the sound output unit 204.

The display unit 203 is a display apparatus. The sound output unit 204 is a sound output apparatus including a speaker.

(Server 100)

The server 100 includes a registration information acquisition unit 101, a registration unit 102, an action DB 103, an action sequence table 104, an image acquisition unit 105, an extraction unit 107, an action specification unit 108, a generation unit 109, a determination unit 110 and a processing control unit 111.

The registration information acquisition unit 101 is also referred to as registration information acquisition means. The registration information acquisition unit 101 acquires a plurality of pieces of video data for registration by an action registration request from the terminal apparatus 200 or through operation by a manager of the server 100. In the second example embodiment, each piece of video data for registration is video data indicating each of individual actions (for example, an action of taking out a product from a basket) included in a normal act or an illicit act of a person. Note that while in the second example embodiment, the video data for registration is a moving image including a plurality of frame images, the video data for registration may be a still image (one frame image).

Further, the registration information acquisition unit 101 acquires a plurality of registration action IDs and information on time-series order in which actions are performed in a series of acts by a sequence registration request from the terminal apparatus 200 or through operation by the manager of the server 100.

The registration information acquisition unit 101 supplies the acquired information to the registration unit 102.

The registration unit 102 is also referred to as registration means. First, the registration unit 102 executes action registration processing in response to an action registration request. Specifically, the registration unit 102 supplies video data for registration to the extraction unit 107 which will be described later and acquires skeleton information extracted from the video data for registration from the extraction unit 107 as registration skeleton information. Then, the registration unit 102 registers the acquired registration skeleton information in the action DB 103 in association with the registration action ID.

Then, the registration unit 102 executes sequence registration processing in response to a sequence registration request. Specifically, the registration unit 102 arranges the registration action IDs in time series based on the information on the time-series order to generate a registration action sequence. In this event, in a case where the sequence registration request is related to a normal action, the registration unit 102 registers the generated registration action sequence in the action sequence table 104 as a normal action sequence NS. On the other hand, in a case where the sequence registration request is related to an illicit action, the registration unit 102 registers the generated registration action sequence in the action sequence table 104 as an illicit action sequence IS.

The action DB 103 is a storage apparatus that stores registration skeleton information corresponding to respective actions included in normal acts in association with the registration action IDs. Further, the action DB 103 may store registration skeleton information corresponding to respective actions included in illicit acts in association with the registration action IDs.

The action sequence table 104 stores the normal action sequence NS and the illicit action sequence IS. In the second example embodiment, the action sequence table 104 stores a plurality of normal action sequences NS and a plurality of illicit action sequences IS.

The image acquisition unit 105 is also referred to as image acquisition means. During operation of the checkout machine 50, the image acquisition unit 105 acquires video data captured by the camera 300 for skeleton from the terminal apparatus 200. In other words, the image acquisition unit 105 acquires video data in response to detection of the start trigger. The image acquisition unit 105 supplies frame images included in the acquired video data to the extraction unit 107.

The extraction unit 107 is also referred to as extraction means. The extraction unit 107 detects an image region (body region) of the body of a person from the frame images included in the video data and extracts (for example, cuts out) the image region as a body image. Then, the extraction unit 107 extracts skeleton information of at least part of the body of the person based on features of joints, and the like, of the person recognized in the body image using a skeleton estimation technique using machine learning. The skeleton information is information constituted with "key points" that are characteristic points such as joints and "bones (bone links)" indicating links between key points. The extraction unit 107 may use a skeleton estimation technique such as, for example, OpenPose. The extraction unit 107 supplies the extracted skeleton information to the action specification unit 108.

The action specification unit 108 is an example of the action specification unit 18 described above. The action specification unit 108 converts the skeleton information extracted from the video image acquired during operation into an action ID using the action DB 103. By this means, the action specification unit 108 specifies an action. Specifically, first, the action specification unit 108 specifies registration skeleton information for which similarity with the skeleton information extracted at the extraction unit 107 is equal to or greater than a predetermined threshold from the registration skeleton information to be registered in the action DB 103. Then, the action specification unit 108 specifies a registration action ID associated with the specified registration skeleton information as an action ID corresponding to the person included in the acquired frame image.

Here, the action specification unit 108 may acquire one action ID based on skeleton information corresponding to one frame image or may specify one action ID based on time-series data of the skeleton information corresponding to each of a plurality of frame images. In a case where the action specification unit 108 specifies one action ID using a plurality of frame images, the action specification unit 108 may extract only skeleton information with large movement and may check the extracted skeleton information against the registration skeleton information in the action DB 103. Extracting only skeleton information with large movement may be extracting skeleton information for which a difference in skeleton information in frame images included within a predetermined period is equal to or greater than a predetermined amount. Such checking of less information can reduce calculation load and only requires a less amount of registration skeleton information. Further, while a duration of an action differs for each person, only skeleton information with large movement is to be checked, so that it is possible to provide robustness in detection of an action.

Note that various methods can be considered as a method for specifying the action ID other than the above-described method. For example, there is a method in which an action ID is estimated from target video data using an action estimation model that learns video data associated with a correct action ID as learning data. However, it is difficult and expensive to collect the learning data. In contrast, in the second example embodiment, skeleton information is used in estimation of the action ID, and comparison with skeleton information registered in advance is performed by utilizing the action DB 103. Thus, in the second example embodiment, the server 100 can more easily specify the action ID.

The generation unit 109 is also referred to as generation means. The generation unit 109 generates an action sequence based on a plurality of action IDs specified at the action specification unit 108. The action sequence includes a plurality of action IDs in time series. The generation unit 109 supplies the generated action sequence to the determination unit 110.

The determination unit 110 is an example of the determination unit 20 described above. The determination unit 110 determines whether the generated action sequence matches (corresponds to) one of the normal action sequences NS registered in the action sequence table 104.

The processing control unit 111 is an example of the processing control unit 21 described above. In a case where it is determined that the generated action sequence does not correspond to any of the normal action sequences NS, the processing control unit 111 outputs alarm information to the terminal apparatus 200.

Note that in a case where it is determined that the above-described action sequence does not correspond to any of the normal action sequences NS, the determination unit 110 may determine whether the above-described action sequence corresponds to one of the illicit action sequences. In this case, the processing control unit 111 may output information determined in advance in accordance with a type of the illicit action sequence to the terminal apparatus 200. As an example, in accordance with a type of the illicit action sequence, a display aspect (such as font, color or thickness of characters, and blinking) in a case where the alarm information is displayed may be changed, or volume or sound itself in a case where the alarm information is output as sound may be changed. This enables a staff of the store to recognize content of the illicit act and promptly and appropriately address the illicit act. Further, the processing control unit 111 may record time, location and video in which the illicit action is performed as history information along with information on the type of the illicit action sequence. This enables a staff of the store to recognize content of the illicit act and take appropriate prevention measures against the illicit act.

Figure 5:
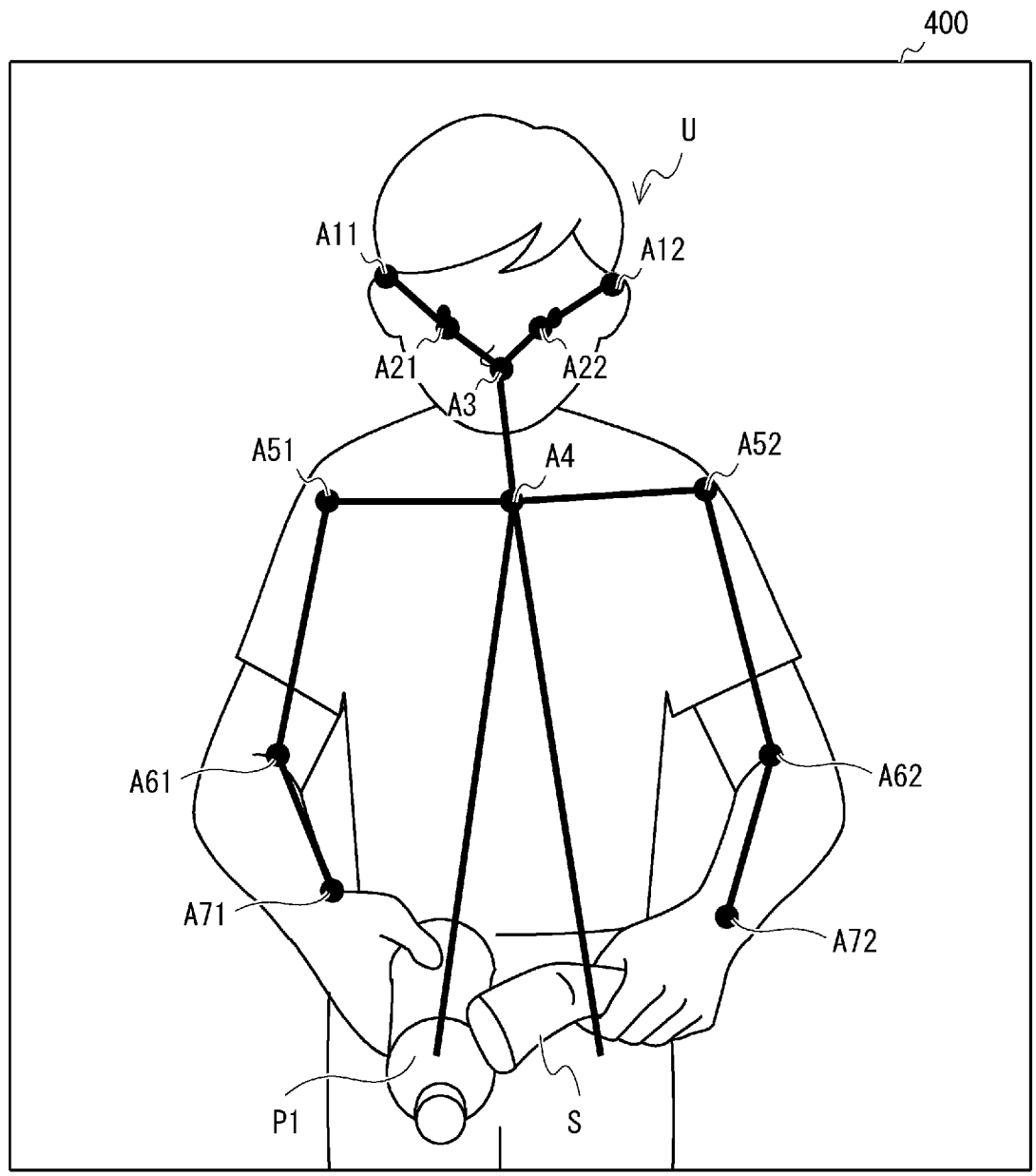
FIG. 5 is a view illustrating skeleton information extracted from a frame image included in video data according to the second example embodiment.

FIG. 5 is a view illustrating the skeleton information extracted from the frame image 400 included in the video data according to the second example embodiment. The frame image 400 includes an image region of the upper body of the user U in a case where a video of the user U who performs a scanning action of a product P1 using the hand scanner S is captured from a front side. Further, the skeleton information illustrated in FIG. 5 includes a plurality of key points and a plurality of bones detected from the upper body. As an example, FIG. 5 illustrates a right ear A11, a left ear A12, a right eye A21, a left eye A22, a nose A3, a neck A4, a right shoulder A51, a left shoulder A52, a right elbow A61, a left elbow A62, a right hand A71 and a left hand A72 as the key points.

The server 100 specifies each action by comparing such skeleton information with the registration skeleton information corresponding to the upper body and determining whether or not they are similar. For example, whether the right hand approaches the left hand is important to specify a scanning action, and positions of the right hand and the left hand in the frame image 400 are important in an action of "taking out a product from the basket" or "putting a product in the basket". Thus, the server 100 may weight the positions of the right hand A71 and the left hand A72 and calculate similarity. Further, the server 100 may weight the right shoulder A51, the left shoulder A52, the right elbow A61 and the left elbow A62 in addition to the right hand A71 and the left hand A72 and calculate similarity.

Figure 6:
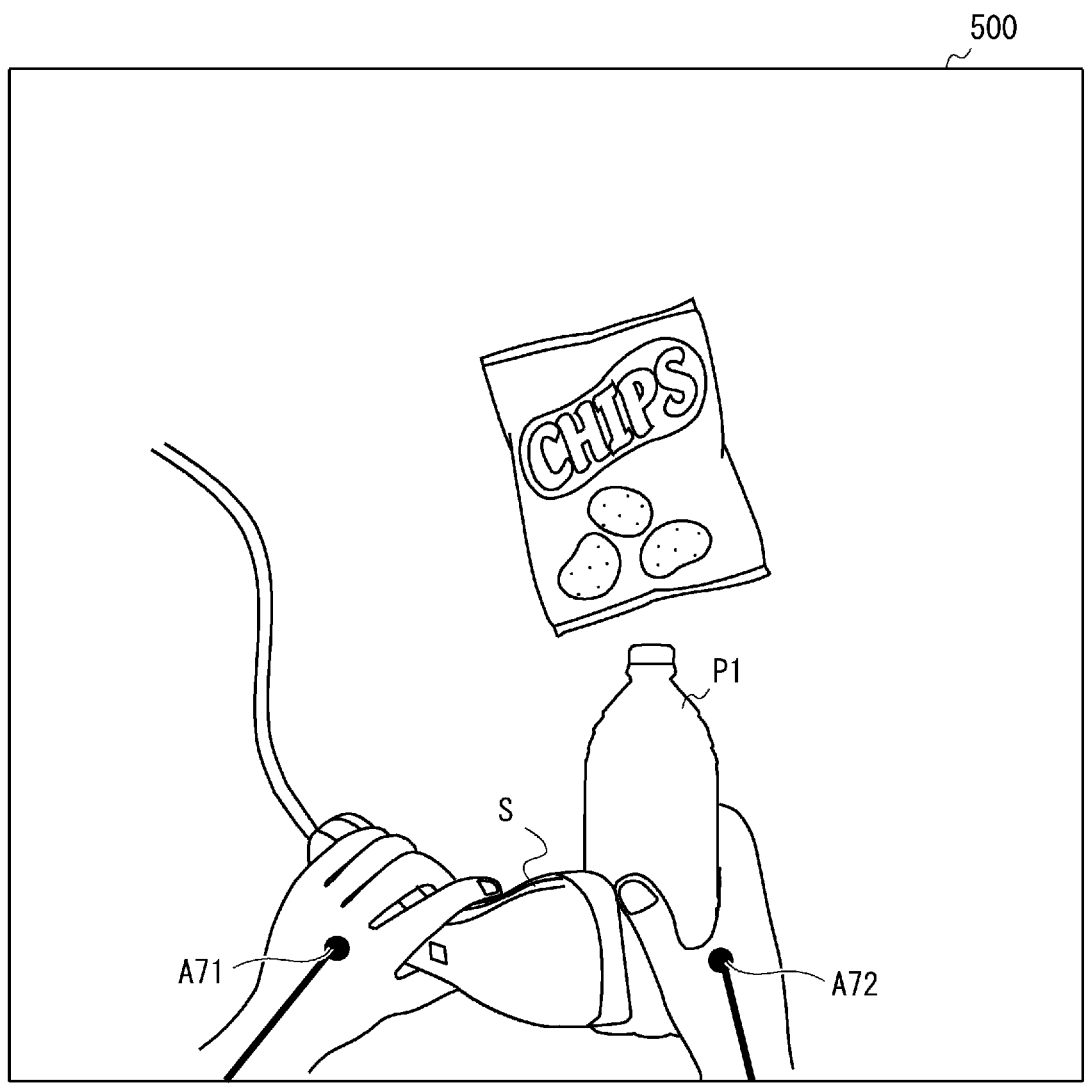
FIG. 6 is a view illustrating skeleton information extracted from a frame image included in video data according to the second example embodiment.

Note that the camera 300 for skeleton may capture a video of at least a hand region of the user U from above. FIG. 6 is a view illustrating skeleton information extracted from a frame image 500 according to the second example embodiment. The frame image 500 includes an image region of a hand region of the user U in a case where a video of the user U who performs a scanning action of the product P1 using the hand scanner S is captured from above. Further, as an example, FIG. 6 illustrate the right hand A71 and the left hand A72 as the key points. Then, the server 100 may determine each action by comparing the skeleton information extracted from the frame image 500 with the registration skeleton information corresponding to the hand region and determining whether or not they are similar.

Figure 7:
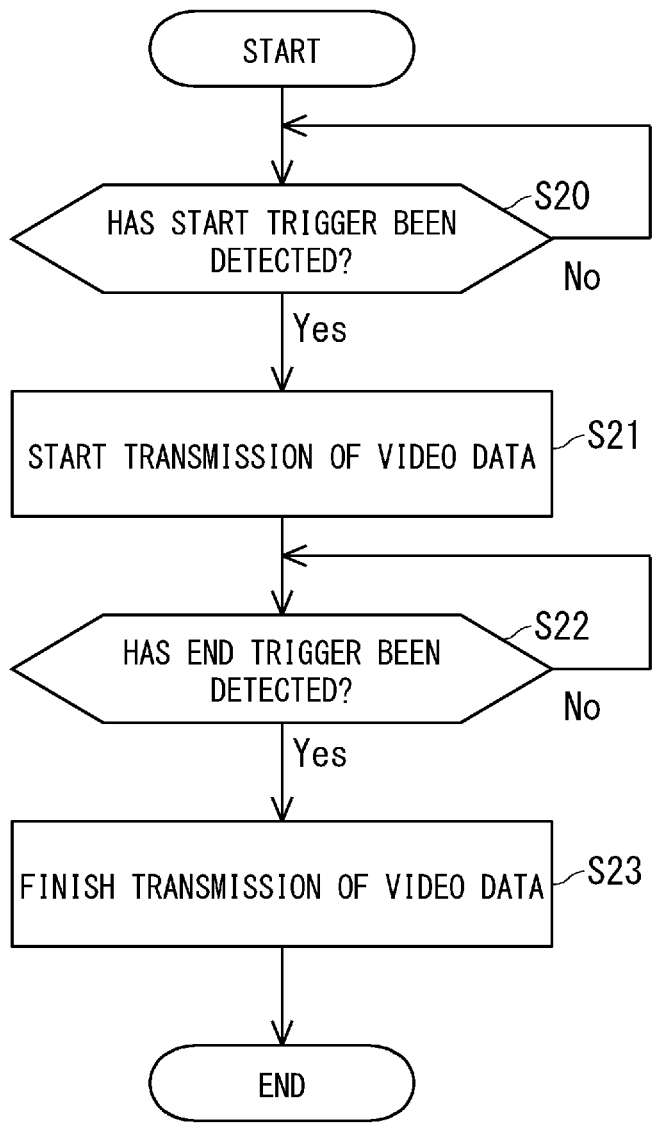
FIG. 7 is a flowchart indicating flow of a method for transmitting video data by the terminal apparatus according to the second example embodiment.

FIG. 7 is a flowchart indicating flow of a method for transmitting video data by the terminal apparatus 200 according to the second example embodiment. First, the control unit 202 of the terminal apparatus 200 determines whether or not the start trigger has been detected (S20). In a case where it is determined that the start trigger has been detected (S20: Yes), the control unit 202 starts transmission of the video data acquired from the camera 300 for skeleton, to the server 100 (S21). On the other hand, in a case where it is not determined that the start trigger has been detected (S20: No), the control unit 202 repeats the processing indicated in S20.

Then, the control unit 202 of the terminal apparatus 200 determines whether or not the end trigger has been detected (S22). In a case where it is determined that the end trigger has been detected (S22: Yes), the control unit 202 finishes transmission of the video data from the camera 300 for skeleton, to the server 100 (S23). On the other hand, in a case where it is not determined that the end trigger has been detected (S22: No), the control unit 202 repeats the processing indicated in S22 while executing transmission of the video data.

In this manner, by limiting a transmission period of the video data between a predetermined start trigger and end trigger, it is possible to minimize a communication data amount. Further, action detection processing at the server 100 can be omitted during a period other than the period, so that it is possible to save calculation resources.

Figure 8:
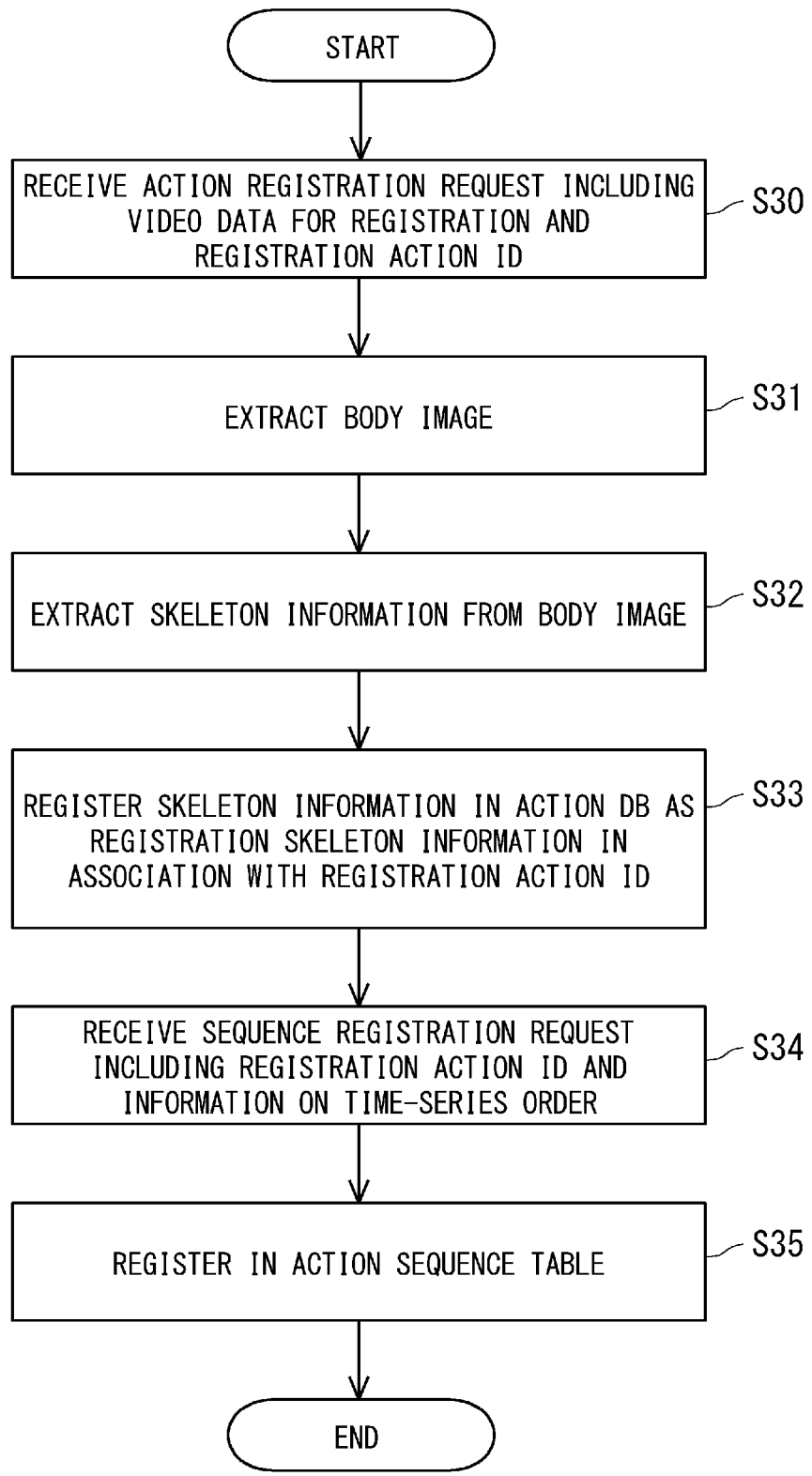
FIG. 8 is a flowchart indicating flow of a method for registering a registration action ID and a registration action sequence by the server according to the second example embodiment.

FIG. 8 is a flowchart indicating flow of a method for registering a registration action ID and a registration action sequence by the server 100 according to the second example embodiment. First, the registration information acquisition unit 101 of the server 100 receives an action registration request including video data for registration and a registration action ID from the terminal apparatus 200 (S30). Then, the registration unit 102 supplies the video data for registration to the extraction unit 107. The extraction unit 107 that has acquired the video data for registration extracts a body image from a frame image included in the video data for registration (S31). Then, the extraction unit 107 extracts skeleton information from the body image (S32). Then, the registration unit 102 acquires the skeleton information from the extraction unit 107 and registers the acquired skeleton information in the action DB 103 as the registration skeleton information in association with the registration action ID (S33). Note that the registration unit 102 may register all registration information extracted from the body image as the registration skeleton information or may register only part of the skeleton information (for example, skeleton information of the shoulder, the elbow and the hand) as the registration skeleton information.

FIG. 9 is a view for explaining a registration action according to the second example embodiment. As an example, registration skeleton information of five registration actions having registration action IDs from "A" to "E" may be stored in the action DB 103. The registration action "A" is an action of taking out the product from the basket 60 before scanning. The registration action "B" is an action of scanning the product using the hand scanner S. The registration action "C" is an action of putting the product in the basket 70 after scanning. The registration action "D" is an action of depressing the scanning end button. The registration action "E" is an action of inputting quantity to the checkout machine.

Returning to FIG. 8, description will be continued. Then, the registration information acquisition unit 101 receives a sequence registration request including a plurality of registration action IDs and information on time-series order of the respective actions from the terminal apparatus 200 (S34). Then, the registration unit 102 registers a registration action sequence (a normal action sequence NS or an illicit action sequence IS) in which the registration action IDs are arranged based on the information on the time-series order in the action sequence table 104 (S35). Then, the server 100 finishes the processing.

FIG. 10 is a view for explaining the normal action sequence NS according to the second example embodiment. As an example, the action sequence table 104 may include at least four normal action sequences NS having normal action sequence IDs from "11" to "14". The normal action sequence "11" is a sequence (A→B→C→D) in which scanning ends after scanning is performed once. The normal action sequence "12" is a sequence (A→B→C→A→B→C→D) in which scanning ends after scanning is performed twice. The normal action sequence "13" is a sequence (A→B→C→E→D) in which scanning is performed once and quantity is input. The normal action sequence "14" is a sequence (A→B→C→E→A→B→C→D) in which after scanning is performed once and quantity is input, scanning is performed once more, and then, scanning ends.

FIG. 11 is a view for explaining the illicit action sequence IS according to the second example embodiment. The action sequence table 104 may include at least two illicit action sequences NS having illicit action sequence IDs from "21" to "22". The illicit action sequence "21" is a sequence (?→A→C→?) including an action of putting the product in the basket 70 after scanning from the basket 60 before scanning without scanning the product. Note that "?" indicates an arbitrary action. Further, the illicit action sequence "22" is a sequence for which none of the registration action IDs is specified between the start trigger and the end trigger and indicates, for example, a case where although the user U stops by the checkout machine 50, the user U leaves the checkout machine 50 without doing anything.

Figure 12:
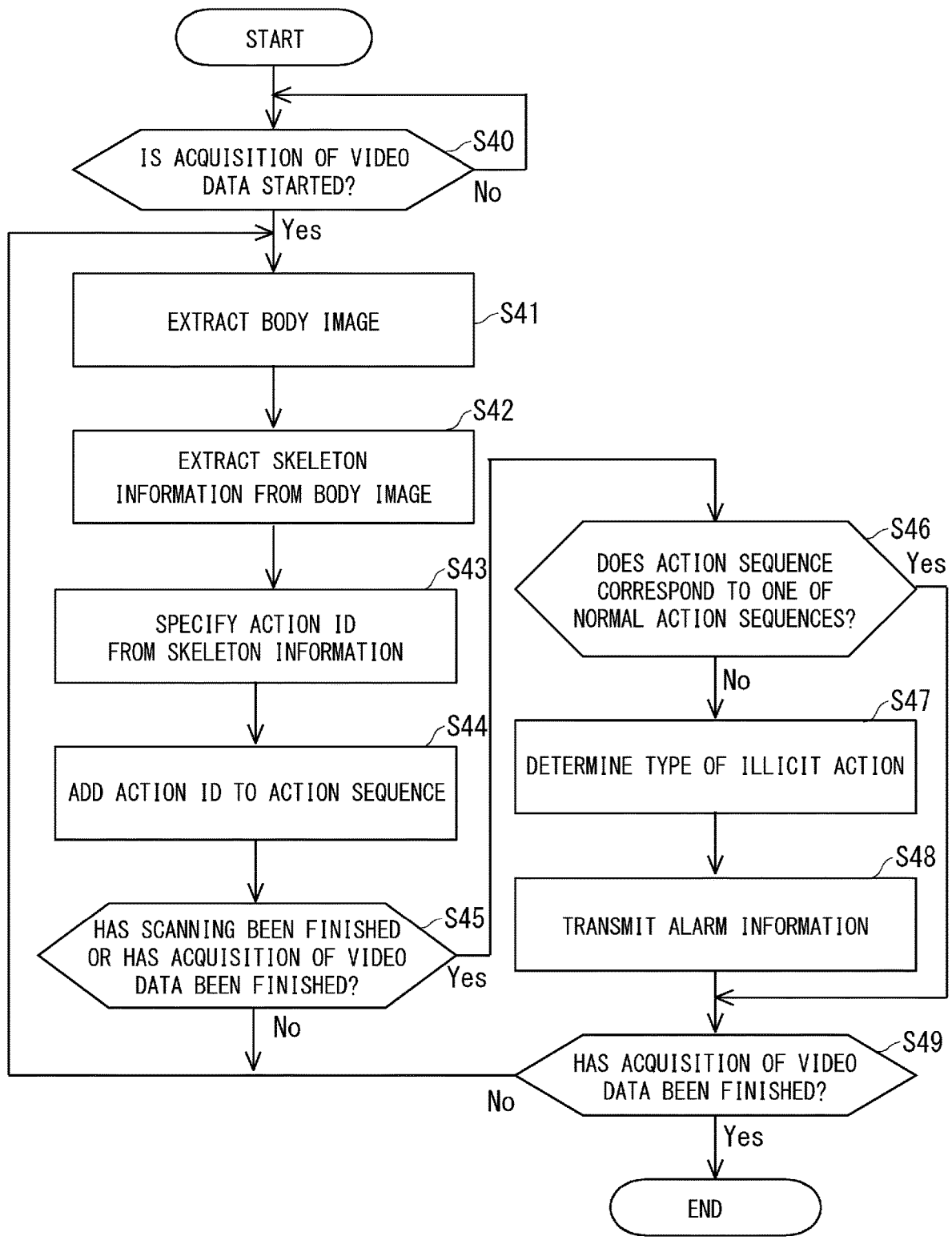
FIG. 12 is a flowchart indicating flow of an action detection method by the server according to the second example embodiment.

FIG. 12 is a flowchart indicating flow of an action detection method by the server 100 according to the second example embodiment. First, in a case where the image acquisition unit 105 of the server 100 has started acquisition of video data from the terminal apparatus 200 (S40: Yes), the extraction unit 107 extracts a body image from a frame image included in the video data (S41). Then, the extraction unit 107 extracts skeleton information from the body image (S42). The action specification unit 108 calculates similarity between at least part of the extracted skeleton information and respective pieces of registration skeleton information registered in the action DB 103 and specifies a registration action ID associated with the registration skeleton information for which similarity is equal to or greater than a predetermined threshold, as an action ID (S43). Then, the generation unit 109 adds the action ID to the action sequence. Specifically, the generation unit 109 sets the action ID specified in S43 as an action sequence in an initial cycle and adds the action ID specified in S43 to the action sequence that has already been generated in the next and subsequent cycles. Then, the server 100 determines whether or not scanning has been finished or acquisition of video data has been finished (S45). Note that in a case where the action specified in S43 is an action of the registration action ID "D", the server 100 may determine that scanning has been finished. In a case where the server 100 determines that scanning has been finished or acquisition of video data has been finished (S45: Yes), the processing proceeds to S46, and in a case where the server 100 does not determine that scanning has been finished or acquisition of video data has been finished (S45: No), the processing returns to S41, and the server 100 repeats processing of adding an action sequence.

In S46, the determination unit 110 determines whether or not the action sequence corresponds to one of the normal action sequences NS in the action sequence table 104. In a case where the determination unit 110 determines that the action sequence corresponds to one of the normal action sequences NS (S46: Yes), the processing proceeds to S49, and in a case where the determination unit 110 determines that the action sequence does not correspond to any of the normal action sequences NS (S46: No), the processing proceeds to S47.

In S47, the determination unit 110 determines a type of the illicit action by determining whether the action sequence corresponds to one of the illicit action sequences IS in the action sequence table 104. Then, the processing control unit 111 transmits alarm information in accordance with the type of the illicit action, to the terminal apparatus 200 (S48). Then, the processing of the server 100 proceeds to S49.

In S49, the server 100 determines whether or not acquisition of video data has been finished. In a case where the server 100 determines that acquisition of video data has been finished (S49: Yes), the processing ends. On the other hand, in a case where the server 100 does not determine that acquisition of video data has been finished (S49: No), the processing returns to S41, and the server 100 repeats processing of adding an action sequence. As a result of the processing returning to S41, it is possible to monitor an action from when scanning is finished until when the user U leaves the checkout machine 50.

In this manner, according to the second example embodiment, the server 100 determines whether or not the action of the user U is normal by comparing the action sequence indicating flow of actions of the user U who has visited the checkout machine 50 with the normal action sequences NS. By this means, by a plurality of normal action sequences NS along flow of operation using the checkout machine 50 being registered in advance, it is possible to implement detection of an illicit action that fits reality. Note that effects similar to those in the first example embodiment can be provided also in the second example embodiment.

Third Example Embodiment

A third example embodiment of the present disclosure will be described next. The third example embodiment has a feature of using sound data in addition to video data in specification of a predetermined action. For example, a predetermined action is a scanning action.

Figure 13:
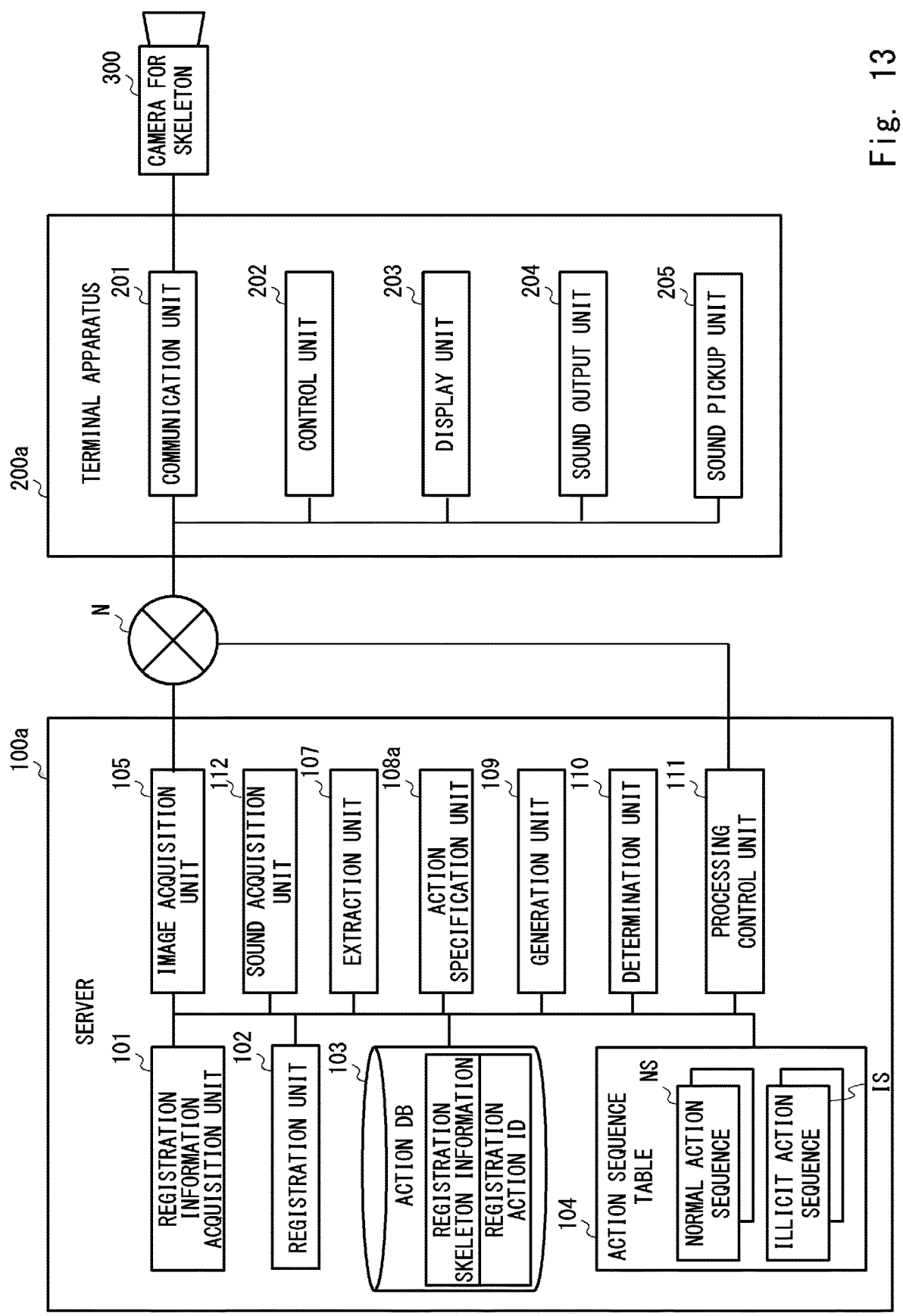
FIG. 13 is a block diagram illustrating configurations of a server and a terminal apparatus according to a third example embodiment.

FIG. 13 is a block diagram illustrating configurations of a server 100a and a terminal apparatus 200a according to the third example embodiment. The terminal apparatus 200a is different from the terminal apparatus 200 in that the terminal apparatus 200a includes a sound pickup unit 205. The sound pickup unit 205 picks up sound around the checkout machine 50. The control unit 202 transmits also sound data to the server 100a in a case where the control unit 202 transmits the video data to the server 100a.

The server 100a includes a sound acquisition unit 112 and an action specification unit 108a in place of the action specification unit 108. The sound acquisition unit 112 acquires sound data from the terminal apparatus 200 and supplies the sound data to the action specification unit 108a.

The action specification unit 108a specifies an action ID based on the skeleton information extracted at the extraction unit 107, the registration skeleton information in the action DB 103, and the sound data acquired by the sound acquisition unit 112. For example, in a case where similarity between the skeleton information extracted at the extraction unit 107 and the registration skeleton information of the registration action ID indicating a predetermined action is equal to or greater than a predetermined threshold, the action specification unit 108a determines whether or not the sound data includes predetermined sound. Then, in a case where the sound data includes predetermined sound, the action specification unit 108a specifies the registration action ID indicating the above-described action as an action ID. On the other hand, in a case where the sound data does not include predetermined sound, the action specification unit 108a does not specify the registration action ID indicating the above-described action as an action ID.

For example, the predetermined action may be an action of scanning the product. In a case where similarity between the extracted skeleton information and the registration skeleton information of a scanning action is equal to or greater than a predetermined threshold, the action specification unit 108a determines whether or not the sound data includes electronic sound generated in a case where scanning is normally performed. Then, in a case where the sound data does not include the electronic sound, the action specification unit 108a does not specify the registration action ID of the scanning action as an action ID. In this case, the action specification unit 108a may specify an action "Be" in which the user U only pretends to perform scanning and does not actually perform scanning. This action includes, for example, an action of waving the hand scanner S over a surface on which there is no barcode of the product.

FIG. 14 is a view for explaining an illicit action sequence according to the third example embodiment. In FIG. 14, an illicit action sequence "23" is added in addition to the illicit action sequences "21" to "22". The illicit action sequence "23" is a sequence (?→A→B'→C→?) including the action "Be" in which the user U only pretends to perform scanning and does not actually perform scanning.

As a result of the server 100a specifying an action using the skeleton information and the sound in combination in this manner, it is possible to increase variations of illicit actions that are desired to be detected.

Fourth Example Embodiment

A fourth example embodiment of the present disclosure will be described next. The fourth example embodiment has a feature that the server determines an action sequence based on the number of items (the number of products) of the products the user U has taken out.

Figure 15:
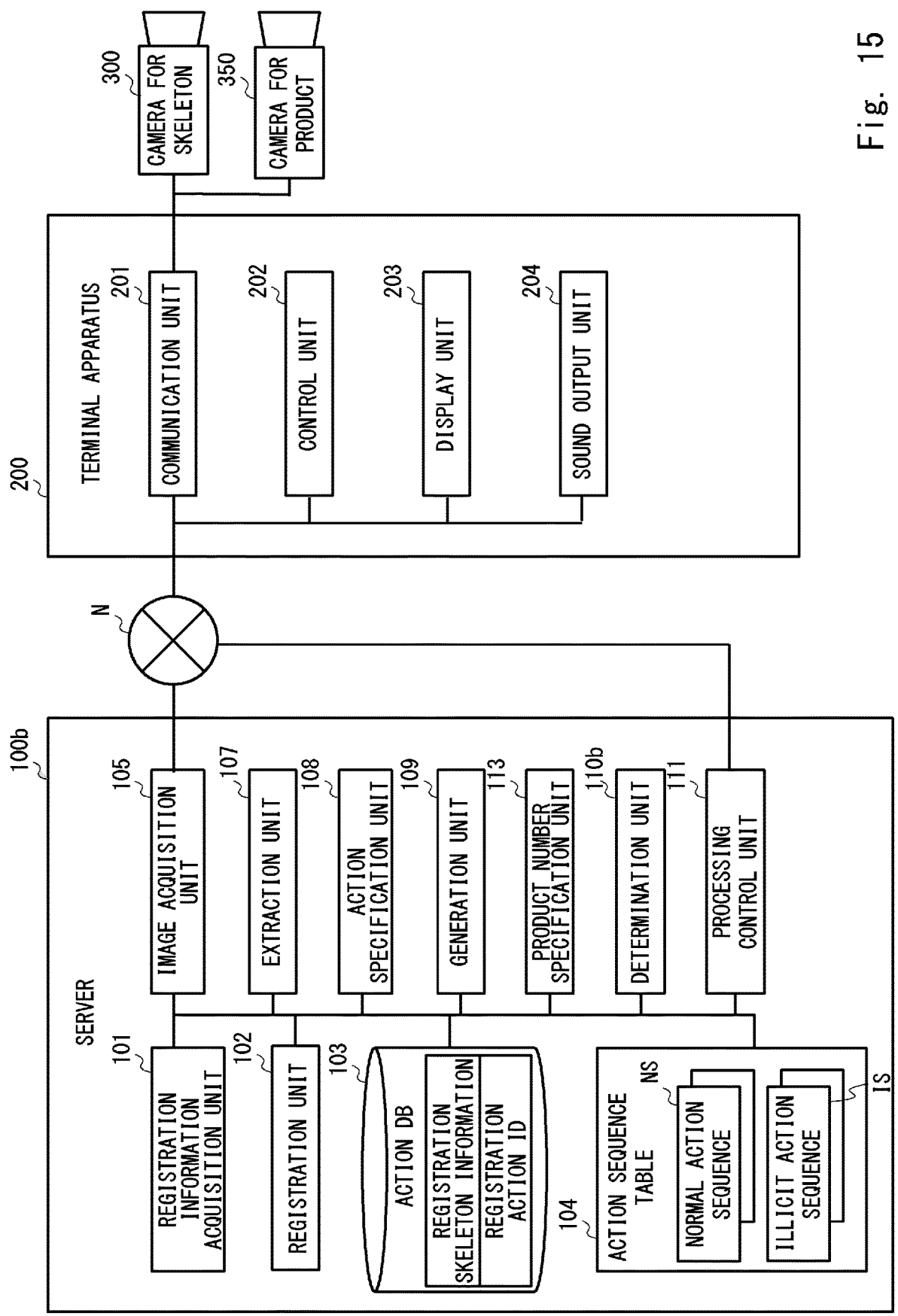
FIG. 15 is a block diagram illustrating configurations of a server and a terminal apparatus according to a fourth example embodiment.

FIG. 15 is a block diagram illustrating configurations of a server 100b and the terminal apparatus 200 according to the fourth example embodiment. The terminal apparatus 200 acquires video data also from a camera 350 for product in addition to the camera 300 for skeleton. The camera 350 for product is a camera that captures a video of the products the user U has taken out. For example, the camera 350 for product may be provided at a position at which the camera 350 for product can capture a video of at least one of the basket 60 before scanning or the basket 70 after scanning from above.

The server 100b is different from the server 100 in that the server 100b includes a product number specification unit 113 and a determination unit 110b in place of the determination unit 110.

The product number specification unit 113 is also referred to as product number specification means. The product number specification unit 113 acquires a video of the camera 350 for product from the terminal apparatus 200 and specifies the number of products based on the video of the camera 350 for product using an object detection method. For example, in a case where the camera 350 for product is a camera that captures a video of the basket 60 before scanning from above, the product number specification unit 113 may specify the number of products from the video of the camera 350 for product acquired in response to the start trigger. Further, for example, in a case where the camera 350 for product is a camera that captures a video of the basket 70 after scanning from above, the product number specification unit 113 may specify the number of products from the video of the camera 350 for product acquired in response to the end trigger. In this case, the product number specification unit 113 may use the video of the camera 350 for product acquired in a case where a weight of the basket 60 before scanning becomes less than a predetermined threshold in specification of the number of products in place of the end trigger.

The determination unit 110b determines whether or not the action sequence generated by the generation unit 109 corresponds to a registration action sequence in accordance with the number of products among the registration action sequences. For example, if the number of products is two, the determination unit 110b determines whether or not there is a normal action sequence NS corresponding to the generated action sequence by comparing the generated action sequence and the normal action sequence NS (the normal action sequence "12" or "13" in FIG. 10) corresponding to the number of products of two.

Figure 16:
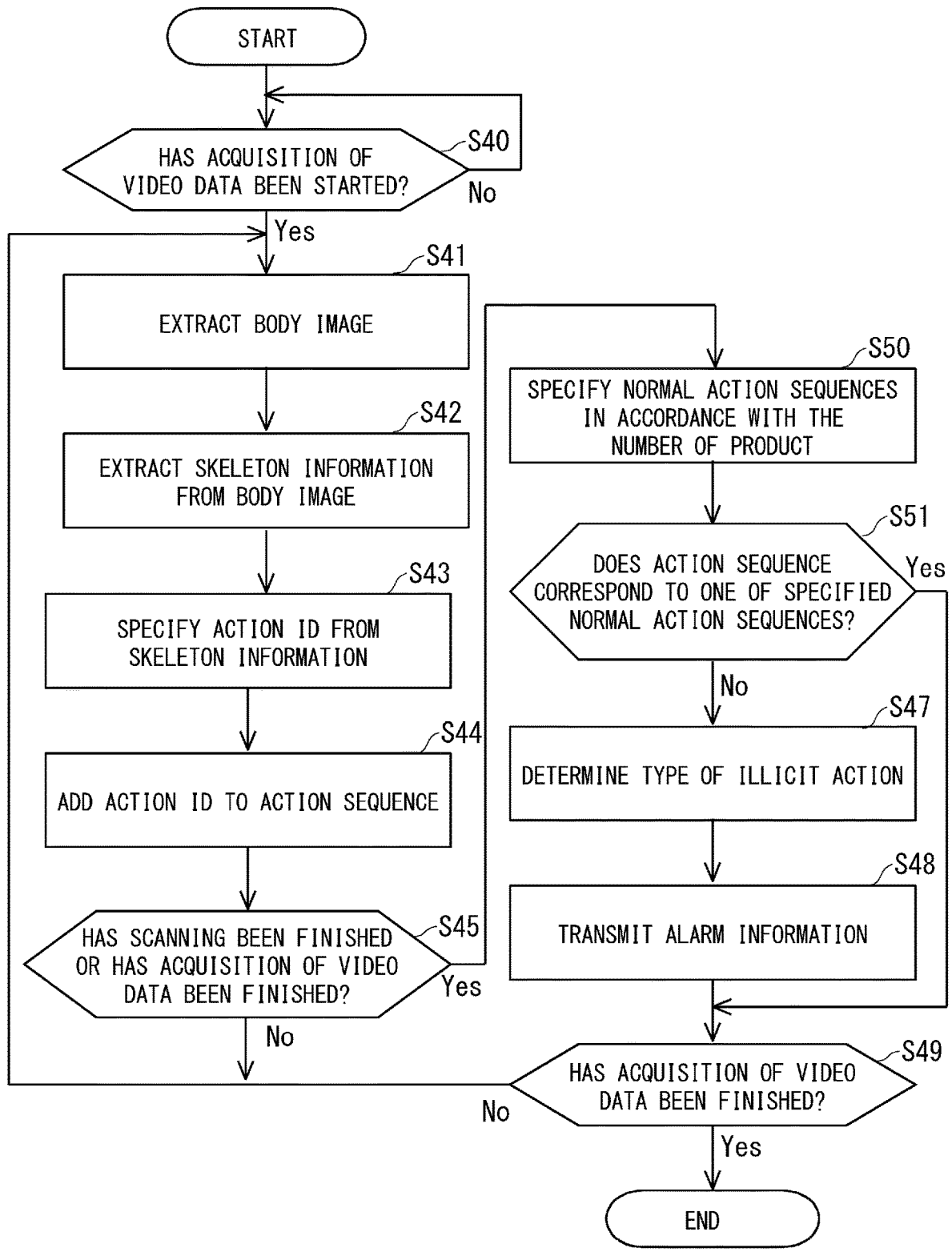
FIG. 16 is a flowchart indicating flow of an action detection method by the server according to the fourth example embodiment.

FIG. 16 is a flowchart indicating flow of an action detection method by the server 100b according to the fourth example embodiment. Steps indicated in FIG. 16 include S50 to S51 in place of S46 indicated in FIG. 12.

In a case where the server 100b determines in S45 that scanning has been finished or acquisition of video data has been finished (S45: Yes), the processing proceeds to S50. In S50, the product number specification unit 113 specifies the number of products based on the video of the camera 350 for product and specifies a normal action sequence NS in accordance with the specified number of products among the normal action sequences NS included in the action sequence table 104. Then, in S51, the determination unit 110b determines whether or not the action sequence corresponds to the specified normal action sequence NS. In a case where the determination unit 110b determines that the action sequence corresponds to the specified normal action sequence NS (S51: Yes), the processing proceeds to S49, and in a case where the determination unit 110b determines that the action sequence does not correspond to the specified normal action sequence NS (S51: No), the processing proceeds to S47.

In this manner, according to the fourth example embodiment, the server 100b uses the number of products in determination of the action sequence, which enables more detailed determination, so that determination accuracy is improved. By this means, for example, even in a case where the user U holds a plurality of products with his/her hand and scans only one product, it is possible to detect the action as an illicit action.

Note that the present disclosure is not limited to the above-described example embodiments and can be changed as appropriate within a range not deviating from the gist. For example, the third example embodiment and the fourth example embodiment can be combined.

Further, for example, in the above-described second to the fourth example embodiments, the registration information acquisition unit 101 acquires video data for registration indicating individual actions upon action registration, and the registration unit 102 registers the skeleton information and the action IDs in the action DB 103 for each piece of registration video data. However, the registration information acquisition unit 101 may acquire video data for registration indicating a series of actions (for example, an action of taking out the product from the basket, scanning the product and putting the product in the basket) including a plurality of individual actions and information on appearance order of the respective individual actions. Then, the registration unit 102 may extract the skeleton information for each of the individual actions included in the video data for registration and register the skeleton information in the action DB 103 along with the action IDs corresponding to the respective individual actions.

Further, in the above-described second to fourth example embodiments, the servers 100, 100a and 100b perform extraction processing, action specification processing, sequence generation processing and determination processing. However, part or all of the processing may be performed by the terminal apparatus 200 or may be performed by an external apparatus (not illustrated) connected to the network N.

While description has been provided in the above-described example embodiments assuming a hardware configuration, the present disclosure is not limited to this. Arbitrary processing of the present disclosure can be implemented by causing a processor to execute a computer program.

In the above-described example, the program includes a command group (or a software code) for causing a computer to perform one or more functions described in the example embodiments in a case where the program is loaded to the computer. The program may be stored in a non-transitory computer-readable medium or a tangible storage medium. By way of example and not of limitation, the computer-readable medium or the tangible storage medium includes a random-access memory (RAM), a read-only memory (ROM), a flash memory, a solid-state drive (SSD) or other memory techniques, a CD-ROM, a digital versatile disc (DVD), a Blu-ray (registered trademark) disc, or other optical disc storages, a magnetic cassette, a magnetic tape, a magnetic disc storage or other magnetic storage devices. The program may be transmitted on a temporary computer-readable medium or a communication medium. By way of example and not of limitation, the temporary computer-readable medium or the communication medium includes propagation signals in electric, optical, acoustic or other forms.

REFERENCE SIGNS LIST 1, 1b, 10 ACTION DETECTION SYSTEM
18 ACTION SPECIFICATION UNIT
20 DETERMINATION UNIT
21 PROCESSING CONTROL UNIT
50 CHECKOUT MACHINE
60 BASKET BEFORE SCANNING
70 BASKET AFTER SCANNING
100, 100a, 100b SERVER
101 REGISTRATION INFORMATION ACQUISITION UNIT
102 REGISTRATION UNIT
103 ACTION DB
104 ACTION SEQUENCE TABLE
105 IMAGE ACQUISITION UNIT
107 EXTRACTION UNIT
108, 108a ACTION SPECIFICATION UNIT
109 GENERATION UNIT
110, 110b DETERMINATION UNIT
111 PROCESSING CONTROL UNIT
112 SOUND ACQUISITION UNIT
113 PRODUCT NUMBER SPECIFICATION UNIT
200, 200a TERMINAL APPARATUS
201 COMMUNICATION UNIT
202 CONTROL UNIT
203 DISPLAY UNIT
204 SOUND OUTPUT UNIT
205 SOUND PICKUP UNIT
300 CAMERA FOR SKELETON
350 CAMERA FOR PRODUCT
400, 500 FRAME IMAGE
S HAND SCANNER
N NETWORK

What is claimed is:
1. An action detection system comprising:
at least one memory storing instructions, and
at least one processor configured to execute the instructions to:
start specification of at least one action ID based on at least part of skeleton information extracted from video data that is a captured video of a user in response to detection of the user visiting checkout machine determined in advance;
determine whether or not an action sequence including the specified at least one action ID corresponds to registration action sequences registered in advance;
execute processing determined in advance in accordance with a determination result;

determine which of an illicit action sequences corresponds to the action sequence, in a case where the action sequence does not correspond to the registration action sequences;

change a font, color, thickness, or blinking of characters of warning information before outputting according to a type of illicit action sequence, in a case of displaying the warning information; and change a volume or voice of the warning information before outputting according to a type of illicit action sequence, in a case of outputting the warning information by voice.

2. The action detection system according to claim 1, wherein the at least one processor is further configured to finish specification of the at least one action ID in response to detection of the user leaving the checkout machine.

3. The action detection system according to claim 1, wherein the at least one processor is further configured to:

start specification of a plurality of action IDs based on at least part of the skeleton information extracted from the video data that is a captured video of the user in response to detection of the user visiting the checkout machine, determine whether or not an action sequence including the specified plurality of action IDs in time series corresponds to the registration action sequences, and execute the processing determined in advance in a case where the action sequence does not correspond to the registration action sequences.

4. The action detection system according to claim 1, wherein the at least one processor is further configured to execute the instructions to:

specify the number of products based on video data that is a captured video of the products taken out by the user, determine whether or not the action sequence corresponds to a registration action sequence in accordance with the number of products among the registration action sequences.

5. The action detection system according to claim 1, wherein the at least one processor is further configured to execute the instructions not to specify the registration action ID indicating a scanning action as an action ID, in a case where predetermined sound is not acquired even though similarity between at least part of the skeleton information and registration skeleton information of a registration action ID indicating the scanning action is equal to or greater than a predetermined threshold.

6. The action detection system according to claim 1, wherein the at least one processor is further configured to execute the instructions to:

acquire video data for registration indicating a predetermined action of a person and at least one registration action ID; and register skeleton information extracted from a frame image included in the video data for registration as registration skeleton information in association with the at least one registration action ID and registering a registration action sequence including the at least one registration action ID.

7. The action detection system according to claim 6, wherein the at least one processor is further configured to execute the instructions to check the at least part of the skeleton information extracted from a different frame image against the registration skeleton information to specify the action ID, in a case where a difference in at least part of skeleton information extracted from a different frame image included in the video data is equal to or greater than a predetermined amount.

8. An action detection method performed by a computer and comprising:

starting specification of at least one action ID based on at least part of skeleton information extracted from video data that is a captured video of a user in response to detection of the user visiting checkout machine determined in advance;

determining whether or not an action sequence including the specified at least one action ID corresponds to registration action sequences registered in advance;

executing processing determined in advance in accordance with a determination result;

determining which of an illicit action sequences corresponds to the action sequence, in a case where the action sequence does not correspond to the registration action sequences;

changing a font, color, thickness, or blinking of characters of warning information before outputting according to a type of illicit action sequence, in a case of displaying the warning information; and changing a volume or voice of the warning information before outputting according to a type of illicit action sequence, in a case of outputting the warning information by voice.

9. A non-transitory computer-readable medium storing a program executable by a computer to perform processing comprising:

starting specification of at least one action ID based on at least part of skeleton information extracted from video data that is a captured video of a user in response to detection of the user visiting checkout machine determined in advance;

determining whether or not an action sequence including the specified at least one action ID corresponds to registration action sequences registered in advance;

executing processing determined in advance in accordance with a determination result;

determining which of an illicit action sequences corresponds to the action sequence, in a case where the action sequence does not correspond to the registration action sequences;

changing a font, color, thickness, or blinking of characters of warning information before outputting according to a type of illicit action sequence, in a case of displaying the warning information; and changing a volume or voice of the warning information before outputting according to a type of illicit action sequence, in a case of outputting the warning information by voice.

* * * * *